No. 685,164. Patented Oct. 22, 1901.
C. A. MORRIS.
VISUAL INDICATOR FOR SUBMERGIBLE BOATS.
(Application filed Nov. 21, 1899. Renewed Apr. 1, 1901.)
(No Model.) 3 Sheets—Sheet 1.
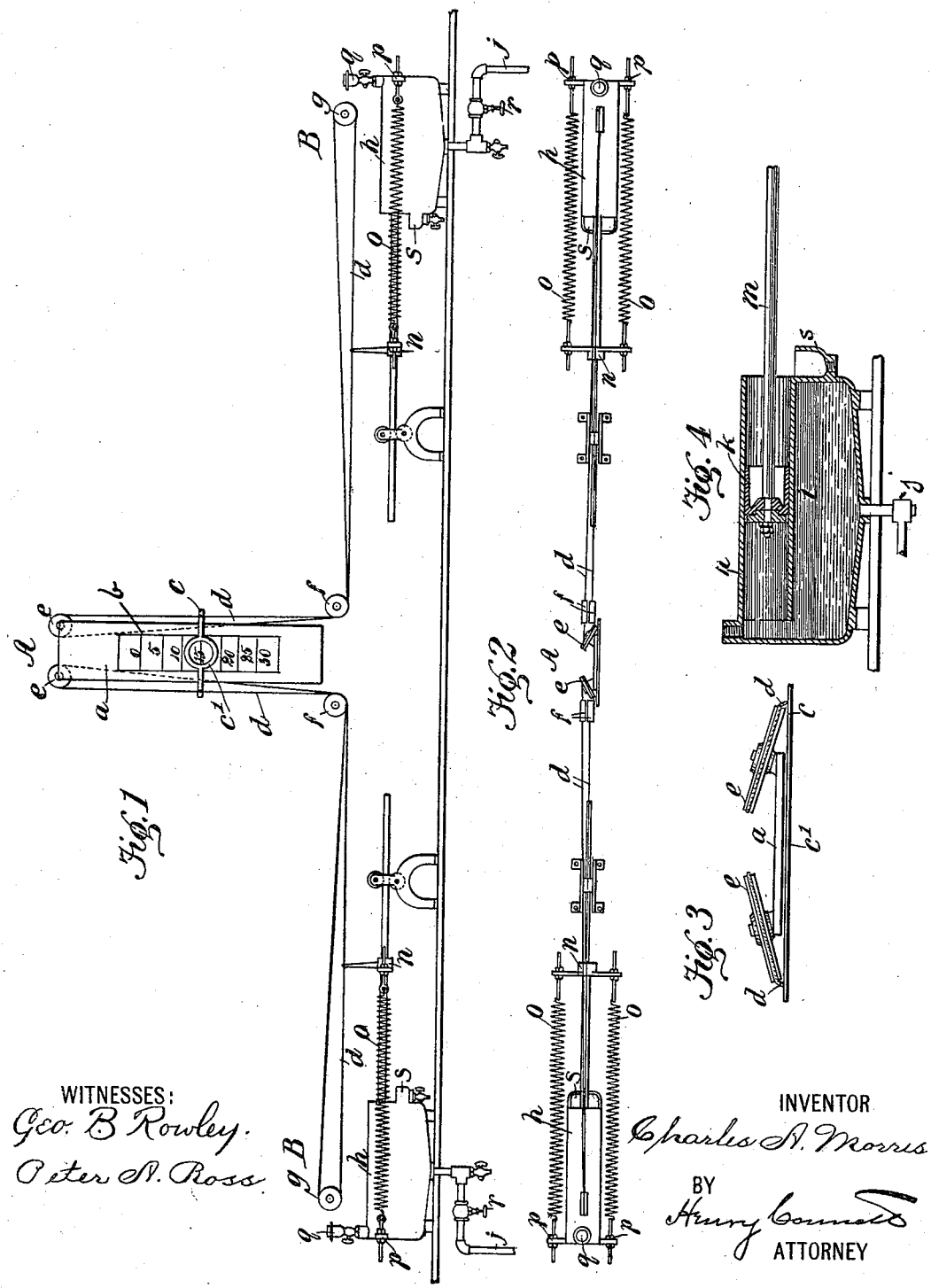
WITNESSES:
Geo. B Rowley.
Peter N. Ross.
INVENTOR
Charles A. Morris
BY
Henry Connett
ATTORNEY No. 685,164. Patented Oct. 22, 1901.
C. A. MORRIS.
VISUAL INDICATOR FOR SUBMERGIBLE BOATS.
(Application filed Nov. 21, 1899. Renewed Apr. 1, 1901.)
(No Model.) 3 Sheets—Sheet 2.
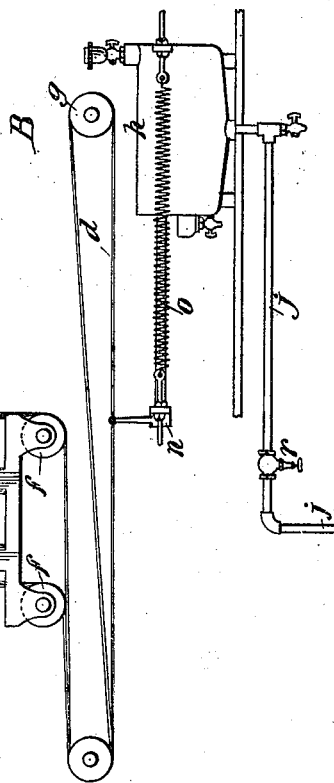
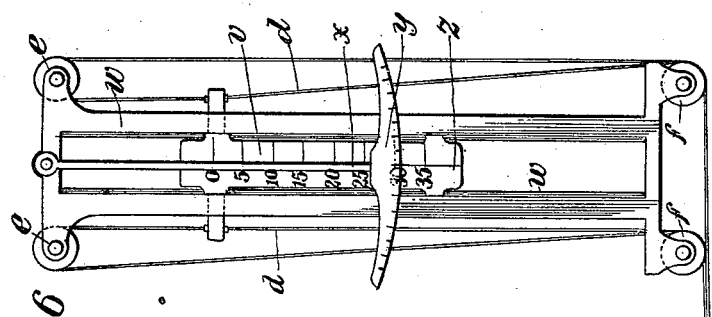
WITNESSES:
Geo. B Rowley,
Peter N. Ross.
INVENTOR
Charles A. Morris
BY
Henry Connett
ATTORNEY

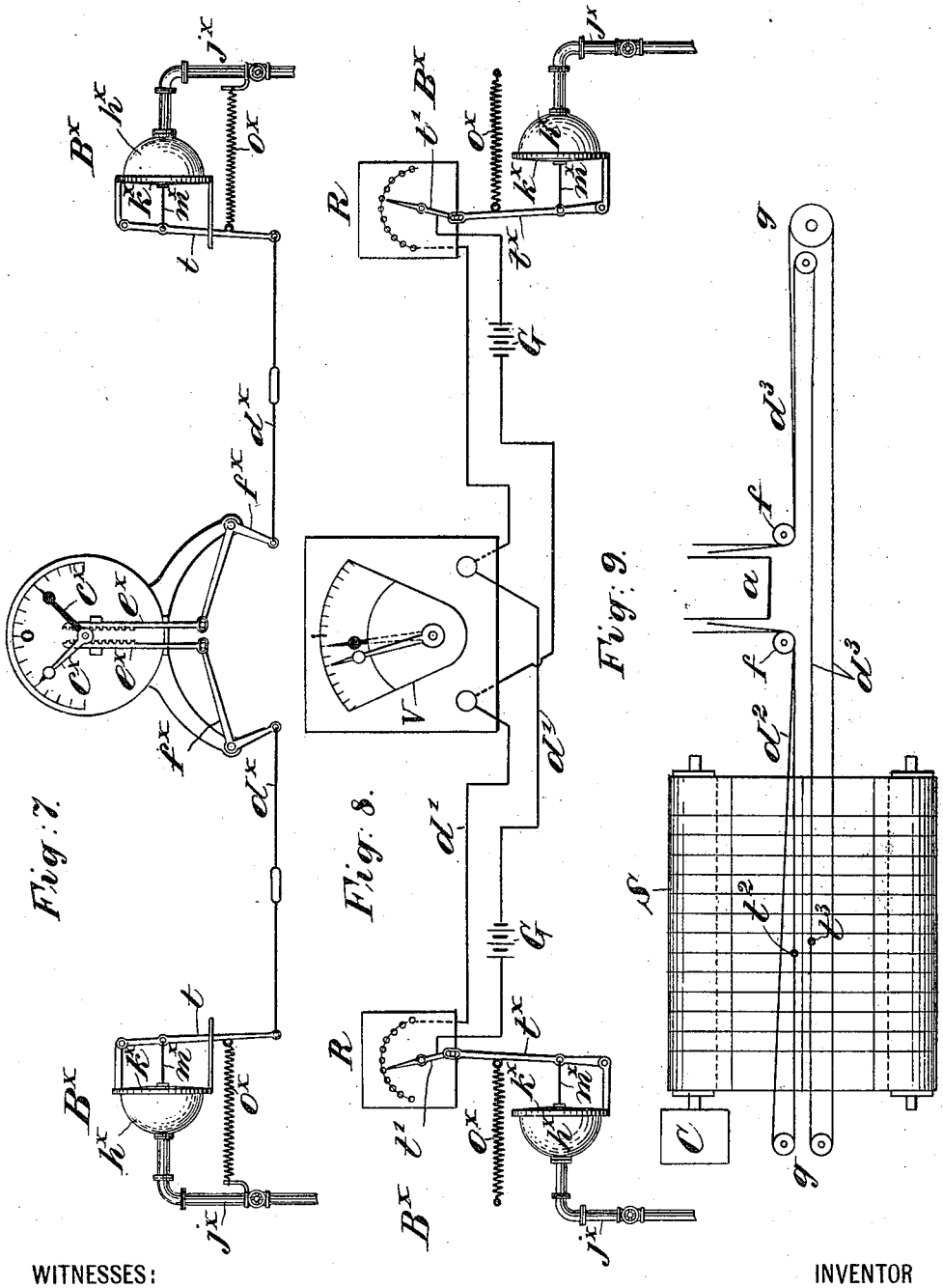

UNITED STATES PATENT OFFICE.

CHARLES A. MORRIS, OF GLENRIDGE, NEW JERSEY.

VISUAL INDICATOR FOR SUBMERGIBLE BOATS.

SPECIFICATION forming part of Letters Patent No. 685,164, dated October 22, 1901.

Application filed November 21, 1899. Renewed April 1, 1901. Serial No. 53,955. (No model.)

*To all whom it may concern:*

Be it known that I, CHARLES A. MORRIS, a citizen of the United States, residing at Glenridge, in the county of Essex and State of New Jersey, have invented certain new and useful Improvements in Visual Indicators for Submergible Boats, of which the following is a specification.

In this class of boats it is important to know at all times the position of the boat's longitudinal axis, whether level or inclined, and if inclined what the degree of inclination may be. This is the more important after diving and during submergence. To attain this end, the present invention comprises means for indicating visually the depth of submergence and combined therewith means for indicating visually at all times the degree of inclination, if any, of the longitudinal axis of the boat.

In the accompanying drawings, which illustrate embodiments of the invention, Figure 1 is a side elevation of the apparatus in one of its forms, and Fig. 2 is a plan of the same. Fig. 3 is a plan of the indicating devices of same on a large scale. Fig. 4 is a longitudnal vertical section of one of the pressure devices on a large scale. Fig. 5 is a view illustrating another form of the indicating devices. In this construction a reversal of the moving and stationary indicating instruments is shown. Fig. 6 is a view illustrating the application of the depth-indicator to a pendulum device for showing the inclination of the boat's axis. Fig. 7 is a view illustrating another form of the invention where a diaphragm is used as a pressure device and another form of depth-indicating device is employed. Fig. 8 illustrates still another form of the invention wherein electricity is employed to connect the pressure device with the indicator. Fig. 9 illustrates the adaptation of a recorder to the indicator.

Referring primarily to Figs. 1 to 4, A represents as a whole the indicating devices or visual indicator, and B B two like pressure devices situated toward the ends of the boat and preferably at like distances from the midship-center of the length of the boat.

The visual indicator A comprises a fixed upright plate $a$, with graduations marked thereon to indicate the depth of submersion. Movable up and down over the face of this plate $a$ is an indicator $c$, which has or may have in it an eye $c'$, through which the numerals of the graduations $b$ can be read. Two endless cords $d$ $d$ are mounted, respectively, on sheaves $e$, $f$, and $g$, and the respective ends of the indicator $c$ are attached to one side of each of said endless cords. The cords are operated by the devices B, one of which will now be described with especial reference to Fig. 4. A cylinder $h$, open at its outer end, is connected at its inner end with an oil-chamber $i$, which has a capacity somewhat in excess of that of the cylinder, and this oil-chamber is connected with the water through the skin of the boat by a pipe $j$, so the pressure of the water, due to submergence, will be transmitted to the oil and will force the latter into the inner end of the cylinder $h$. In the cylinder is a piston $k$, provided with a piston-rod $m$, which has a cross-head $n$, and to the ends of this cross-head are secured two long coil-springs $o$ $o$, which extend back and have couplings $p$, by which they are adjustably secured to the cylinder. The cross-head $n$ is secured to one side of the endless cord $d$.

The operation is as follows: As the boat sinks or dives the pressure of the water of submergence on the oil in the oil-chamber causes the latter to force the piston outward in the cylinder against the springs $o$, the strength of which is accurately tested. The cross-head $n$ moves the endless cord over the guide-sheaves and moves the indicator $c$ over the graduations on the plate $a$, thus indicating visually the degree of submergence. As one of the pressure devices B connects with the water of submergence at one end of the boat and the other at the opposite end thereof, if the boat is depressed more at one end than the other, the indicator $c$ will assume an oblique position, thus indicating visually the position or angle of inclination of the axis of the boat. In other words, the indicator $c$ visibly signalizes both the depth of submersion amidships and the variation of level of the keel, if there be any. The employment of a piston in the pressure device renders it necessary to reduce the friction to the minimum and to maintain it substantially constant, and hence the employment of a body of oil between the water and the cylinder. As the volume of oil is equal to the capacity of the cylinder, no water can get into the latter, and perfect lubrication and freedom from rust or corrosion are assured. A filling-inlet $q$ is provided for the oil and a cock $r$ in the pipe $j$ to close the oil-chamber from the water when necessary. The oil that may find its way past the piston will drip into a cup $s$, which is provided with a drainage-cock. The indicating devices A may be conveniently placed in the conning-tower of the boat and the devices B B in any convenient places in the boat.

Good results may be obtained by the construction of the indicating devices as shown in Fig. 5. In this construction there is a fixed or stationary indicator-bar $t$, and the plate $w$, having on it the graduation-marks $b$, is carried up and down by the endless cords. In this construction the plates $u$ will be inclined according to the inclination of the axis of the boat. This construction is in most respects a mere reversal of the construction seen in the principal views.

Fig. 6 illustrates another construction, wherein but one pressure device or mechanism connecting with the water of submergence amidships is employed. The cords $d$ connect with a graduated plate $v$, mounted in a guide-frame $w$ and adapted to be moved up and down therein by the pressure device B. In this construction the inclination of the axis of the boat is visually indicated by a pendulum $x$, which may have graduations $y$ along its lower edge to indicate the degree of inclination by reference to a vertical line $z$ on the plate $v$.

Obviously there are various specific constructions that may be adopted for carrying out my invention, and I do not limit myself to those herein shown. I should hold as coming within my invention any indicating device of this general character wherein are combined a visual depth-indicator operated by the water in which the boat is submerged and a visual inclination-indicator which shows the position of the longitudinal axis of the boat.

The cords $d$ may of course be flexible connectors of any kind, as fine wires, chains, &c. Indeed, any other equivalent connecting and driving means may be employed in lieu of the endless cords. The upright position of the graduated indicating-plates is not essential, but it is a convenient arrangement for a visual indicator.

Fig. 7 illustrates a form of the apparatus wherein the pressure devices are represented as diaphragms and the indicating devices are hands moving independently about a graduated dial, the mechanism between the pressure device and visual indicator being racks and pinions. The pressure device $B^\times$ comprises a diaphragm-casing $h^\times$, having a diaphragm $k^\times$. This diaphragm is acted on by the water of submergence entering the chamber behind it through a pipe $j^\times$, and the diaphragm acts in turn on a lever $t$ through a rod or stem $m^\times$. A spring $o^\times$ resists the movement of the diaphragm. The plate is in the form of a graduated dial traversed by two hands or indicators $c^\times$, one operated by each pressure device $B^\times$ through the medium of a rod $d^\times$, a bell-crank lever $f^\times$, and a rack $e^\times$, which meshes with a pinion on the hand-arbor. Where the two hands turn about one center, as here shown, the arbor of one hand will be tubular and be slipped over the other and the pinions will be in different planes.

It may sometimes be that mechanical transmission of power from the pressure device to the indicating device is not possible or convenient, owing to the construction of the boat, and in this case electrical means may be employed. One form of such a device is shown in Fig 8. In this figure the pressure devices are the same as in Fig. 7 and have the same reference-letters, but the lever $t^\times$ acts on a contact-lever $t'$, which plays over the contacts of a rheostat R in a circuit $d'$, which circuit includes a generator G and a voltmeter V. There is a voltmeter, with its hand or indicator, for each pressure device, one meter being placed directly behind the other, with their hands playing over one series of graduations on a plate behind. Obviously the movement of the lever $t^\times$ will put more or less resistance into the circuit $d'$, and thus influence the voltmeter in a way that will be readily understood by those skilled in the art.

It will be understood that the pressure device illustrated in Figs. 1 to 4 may be substituted for that seen in Figs. 7 and 8. The pressure device where a piston is employed is advantageous in giving a greater extent of movement than a diaphragm; but either form may be employed.

Fig. 9 shows how the device or apparatus seen in Figs. 1 and 2 may be supplied with means for recording the position of the axis of the boat. In this diagrammatical view, S represents a ruled traveling sheet to receive the record, said sheet being driven by a suitable clock mechanism C. On the endless cords or connectors $d^2$ $d^3$ are respectively secured pencils or other markers $t^2$ $t^3$, which bear on the sheet S and leave a record.

I am well aware that a pendulum has been before employed to indicate the lateral and longitudinal inclination of a boat and that depth-indicators have been employed on submergible or submarine boats, as well as automatic means for keeping such a boat on an even keel. These devices I do not claim. My invention includes a depth-indicator and inclination-indicator coactively combined and provided with graduations to indicate visually the degree of submergence and inclination, and this combination I believe to be new.

Having thus described my invention, I claim—

1. In means for visually indicating the depth of submergence amidships and the position of the longitudinal axis of a submergible boat, the coactive combination with a pressure mechanism, actuated by the water of submergence, and a visual depth-indicator, operated by said pressure mechanism, of means, controlled by the inclination of the longitudinal axis of the boat for visually indicating said inclination.

2. In means for visually indicating the depth of submergence amidships and the position of the longitudinal axis of a submergible boat, the coactive combination with a pressure mechanism, actuated by the water of submergence, and a visual depth-indicator, operated by said pressure mechanism, of means, actuated also through the water of submergence and a pressure mechanism, for visually indicating the inclination of the longitudinal axis of the boat.

3. In means for visually indicating the depth of submergence amidships and the position of the longitudinal axis of a submergible boat, the combination with a pressure mechanism comprising two like pressure devices connecting respectively with the water of submergence at opposite ends of the boat, and endless cords operated by the respective pressure devices, of a visual depth-indicator and a visual inclination-indicator, both operated by said cords.

4. In means for visually indicating the depth of submergence amidships and the position of the longitudinal axis of a submergible boat, the combination with a pressure mechanism consisting of two like pressure mechanisms connecting respectively with the water of submergence at opposite ends of the boat, and endless cords operated by the respective pressure devices, of a stationary, graduated plate $a$, and an indicator $c$, adapted to move over the face of said plate, said indicator being connected at its ends to the respective operating-cords.

5. In a depth-indicating mechanism for submergible boats, the combination with indicating devices comprising a plate with graduations and an indicator, of a pressure device for operating the same, said device comprising a cylinder, a piston therein, an oil-chamber connected with said cylinder, and a pipe which is adapted to admit water to said oil-chamber, which latter has a capacity not less than that of the cylinder.

6. The combination with a cylinder, a piston therein, the piston-rod, and a spring or springs to resist the outward movement of the piston, of an oil-chamber connected with the inner end of the cylinder, said oil-chamber having a capacity equal to that of the cylinder and an inlet for water, substantially as and for the purposes set forth.

7. In means for visually indicating the depth of submergence amidships and the position of the longitudinal axis of a submergible boat, the combination with a pressure mechanism comprising two like pressure devices connecting respectively with the water of submergence at opposite ends of the boat, and means operated by the respective pressure devices, of a visual depth-indicator and a visual inclination-indicator, both operated by said means.

8. In means for indicating the depth of submergence of a vessel and the inclination of its axis, the combination with visual indicators for the depth and axial inclination, of a recorder for recording the axial inclination, substantially as set forth.

In witness whereof I have hereunto signed my name, this 16th day of November, 1899, in the presence of two subscribing witnesses.

CHARLES A. MORRIS.

Witnesses:
 PETER A. ROSS,
 HENRY CONNETT.